US005683666A

United States Patent [19]

Berisko

[11] Patent Number: 5,683,666
[45] Date of Patent: Nov. 4, 1997

[54] METHOD FOR THE REMOVAL OF SULFUR DIOXIDE AND NITROGEN OXIDES FOR A GASEOUS STREAM

[75] Inventor: Daniel W. Berisko, Coraopolis, Pa.

[73] Assignee: Dravo Lime Company, Pittsburgh, Pa.

[21] Appl. No.: 602,876

[22] Filed: Jan. 19, 1996

[51] Int. Cl.⁶ .................................................. C01B 17/22
[52] U.S. Cl. .......................... 423/243.08; 423/235
[58] Field of Search ............................... 423/243.08, 235

[56] References Cited

U.S. PATENT DOCUMENTS

| | | | |
|---|---|---|---|
| 4,612,175 | 9/1986 | Harkness et al. | 423/235 |
| 4,670,234 | 6/1987 | Holter et al. | 423/235 |
| 4,957,716 | 9/1990 | Cichanowicz et al. | 423/235 |
| 5,200,160 | 4/1993 | Benson et al. | 423/235 |
| 5,246,680 | 9/1993 | Pikkujamsa | 423/244.07 |
| 5,384,111 | 1/1995 | Tseng et al. | 423/242.1 |
| 5,618,511 | 4/1997 | Randolph et al. | 423/545 |

*Primary Examiner*—Deborah Jones
*Assistant Examiner*—Amy M. Harding
*Attorney, Agent, or Firm*—Armstrong, Westerman, Hattori, McLeland & Naughton

[57] ABSTRACT

A process for the simultaneous removal of sulfur dioxide and nitrogen oxides from a gaseous stream uses a sorbent containing magnesium ions and sulfite ions for sulfur dioxide removal and a metal chelating agent for nitrogen oxides removal, with the production of an amine disulfonate salt, such as potassium amine disulfonate, as a purified saleable by product.

10 Claims, 1 Drawing Sheet

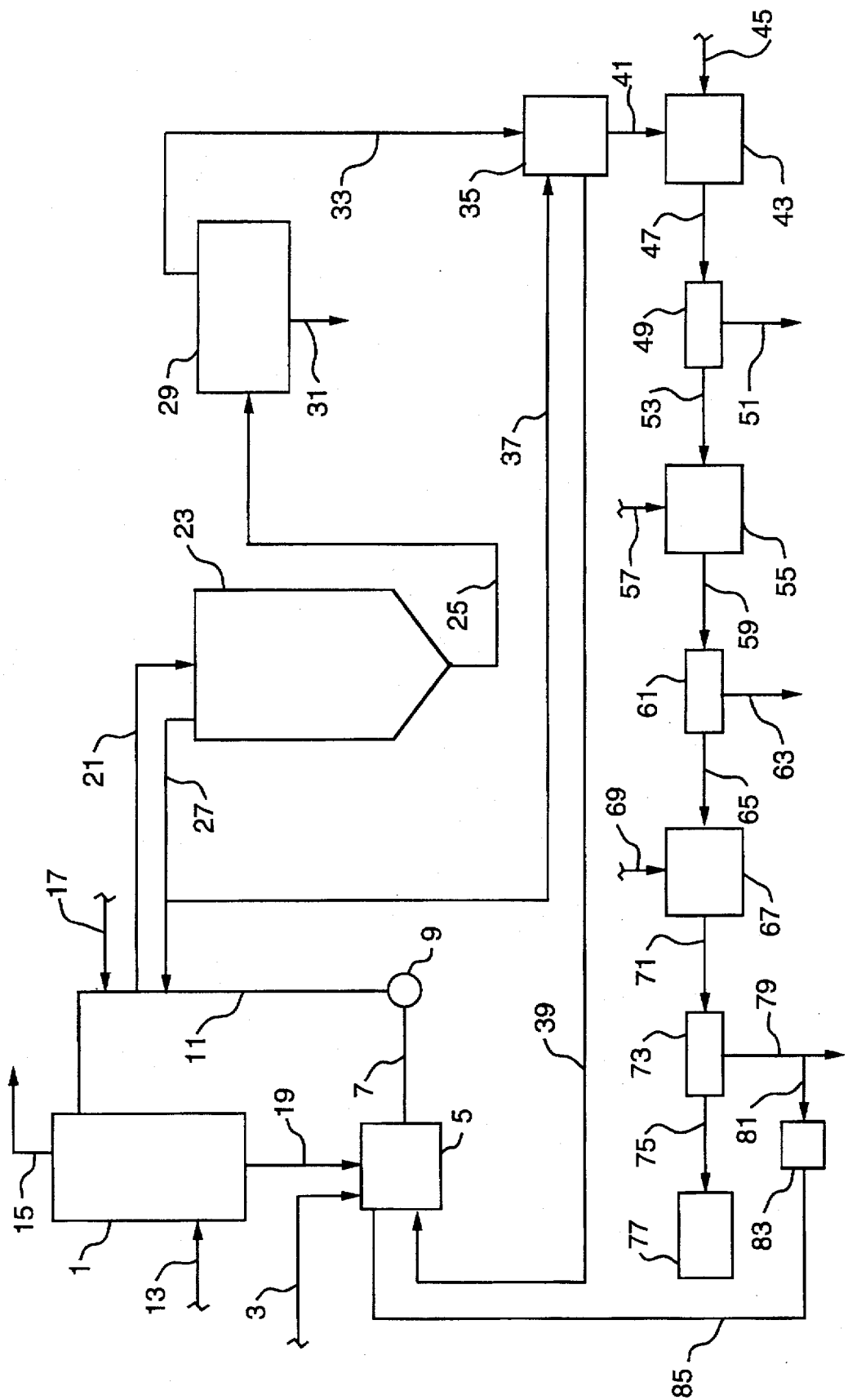

METHOD FOR THE REMOVAL OF SULFUR DIOXIDE AND NITROGEN OXIDES FOR A GASEOUS STREAM

FIELD OF THE INVENTION

The present invention relates to an improved method for the simultaneous removal of sulfur dioxide and nitrogen oxides from a gaseous stream using a sorbent containing magnesium ions and sulfite ions and a metal chelating agent where a purified solid amine disulfonate salt product is produced.

BACKGROUND OF THE INVENTION

The use of aqueous scrubbing slurries using lime for removing sulfur dioxide from hot combustion gas streams has been well known, as has the use of magnesium-enhanced lime scrubbing slurries which incorporate magnesium ions into the lime scrubbing slurry. Also, the simultaneous removal of nitrogen oxides and sulfur dioxide from gaseous streams has been known, where a metal chelate such as ferrous ethylenediaminetetraacetic acid (ferrous EDTA) is added to a lime slurry as a promoter to remove the nitrogen oxides. In such simultaneous removal processes, as described, for example in U.S. Pat. Nos. 4,612,175, 4,670,234 and 5,200,160, the latter assigned to the assignee of the present invention, and the contents of all three said patents incorporated by reference herein, the metal chelate acts, along with sulfite ions, sulfur dioxide and nitrogen oxides, to produce hydroxylamine disulfonate (HADS), $HON(SO_3H)_2$, and related compounds in an aqueous scrubbing medium along with solid sulfites, such as calcium sulfite. Where magnesium ions are present, magnesium sulfites are also produced.

The HADS, produced in such a process, along with related nitrogen-sulfur (N—S) compounds, must be purged from the flue gas desulfurization system since these dissolved compounds can interrupt the chemistry of the process and interfere with the disposal of process water and solids. In U.S. Pat. No. 4,957,716, for example, the aqueous scrubbing mixture is contacted at a pH of about 4.5 to 7.0 with the sulfur dioxide and nitrogen oxides to form hydroxylaminedisulfonates and related compounds and this resulting mixture contacted in a separate reaction zone at a pH of 4.2 or less to produce an aqueous solution containing ammonium ions and sulfate ions. The resulting solution is then contacted with a second ammoniumion-absorbing sorbent to remove ammonium ions. The resultant ammonium-free aqueous mixture can then be treated to remove sulfate ions, while the ammonium ions are then absorbed from the sorbent, converted to ammonia and reacted at high temperatures with additional nitrogen oxides to form nitrogen and water.

In magnesium-enhanced lime scrubbing processes with metal chelates present, and in other sulfite ($SO_3^=$) rich systems, the primary stable solution species of N—S compound is believed to be amine disulfonate or ADS, $HN(SO_3^-)_2$. Amine disulfonate metal salts have been found to be useful as a crystal modifier in magnesium-enhanced lime scrubbing systems, as described in U.S. Pat. No. 5,384,111, assigned to the assignee of the present invention and incorporated by reference herein, and capable of improving the dewatering characteristics of the calcium sulfite sludges produced in such systems.

It is an object of the present invention to provide a method for the removal of sulfur dioxide and nitrogen oxides from a gaseous stream using a sorbent containing magnesium ions and sulfite ions, along with a metal chelate, where the N—S compound produced are converted to a usable byproduct, such as potassium amine disulfonate.

SUMMARY OF THE INVENTION

A method for removing sulfur dioxide and nitrogen oxides from a gaseous stream includes contacting the gaseous stream in a wet scrubbing unit with a magnesium and sulfite ion-containing sorbent, such as a magnesium-enhanced lime aqueous scrubbing medium, at a pH of between 5.5 and 7.0, in the presence of a chelating agent such as ferrous ethylenediaminetetraacetic acid, to react with the sulfur dioxide and the nitrogen oxides. The aqueous scrubbing medium, after reactions take place, contains magnesium ions, solid sulfites, such as calcium sulfite, dissolved sulfites, such as magnesium sulfite, and various dissolved N—S reaction products such hydroxylaminedisulfonate. A portion of the resultant aqueous medium is removed from the wet scrubbing unit and the solid sulfites are separated, such as in a hydroclone or filtering unit, and discharged from the system. The clarified aqueous medium, containing magnesium ions, dissolved sulfites and hydroxylaminedisulfonate is basified to a pH of at least 10.0 to convert the magnesium ions to a magnesium hydroxide precipitate which is then separated from the aqueous medium. An oxidizing agent, such as hydrogen peroxide is then added to the aqueous medium so as to convert the dissolved sulfites to sulfates which precipitate from the aqueous medium and are separated. After separation of the sulfates, the aqueous solution which contains N—S compounds has added thereto a sulfate salt, such as potassium sulfate, which reacts with the N—S compounds to produce an amine disulfonate salt, such as potassium amine disulfonate, that precipitates from the aqueous solution and is recovered.

BRIEF DESCRIPTION OF THE DRAWING

The drawing is a schematic illustration of a preferred embodiment of the present method for removing sulfur dioxide and nitrogen oxides from a gaseous stream and producing an amine disulfonate salt product.

DETAILED DESCRIPTION

The present method removes sulfur dioxide and nitrogen oxides from a gaseous stream while producing a purified amine disulfonate salt.

A gaseous stream that contains sulfur dioxide and nitrogen oxides is contacted in a wet scrubbing unit with an aqueous scrubbing medium that contains magnesium ions and sulfite ions for reaction with the sulfur dioxide to form solid sulfites and dissolved sulfites. The sorbent for the sulfur dioxide is preferably an aqueous slurry of calcium hydroxide with magnesium oxide or magnesium hydroxide present in an amount to provide about 2500 to 9000 parts per million of an effective magnesium ion content in the aqueous scrubbing medium in a wet scrubbing unit. In addition to the sorbent for removal of sulfur dioxide, a metal chelating agent for removal of nitrogen oxides is provided in the aqueous scrubbing medium in the wet scrubbing unit, with ferrous-EDTA being a preferred metal chelating agent. Reaction of the absorbed nitrogen oxides with the dissolved sulfites produces N—S reaction products such as hydroxylaminedisulfonate in the aqueous scrubbing medium. The pH of the aqueous scrubbing medium should be maintained at between about 5.5 to 7.0 in the wet scrubbing unit.

A portion of the reacted aqueous medium which contains magnesium ions, solid sulfites, dissolved sulfites and hydroxylaminedisulfonate is removed from the wet scrubbing unit as a bleed stream and the solid sulfites, such as calcium sulfite, are removed such as by separation in a thickening or clarifying device. The separated calcium sulfites may be further treated to form gypsum or may be discarded. The aqueous medium, after separation of the solid sulfites will typically contain the following: 4000–10,000 ppm (parts per million) magnesium ions ($Mg^{++}$); 500–800 ppm calcium ions ($Ca^{++}$); 4000–10,000 ppm, sulfite ions ($SO_3^{-2}$); about 5,000 ppm total iron ions ($Fe^{++}$ and $Fe^{+++}$: about 100 mM); about 1500 ppm ferrous ions ($Fe^{++}$: 30 mM); about 34,500 ppm EDTA ions (about 120 mM); 10,000–15,000 ppm sulfate ions ($SO_4^{-2}$); and have a pH of between 5.0–6.0. After separation of the solid sulfites from the portion of aqueous medium, the aqueous medium which now contains dissolved sulfites and hydroxylaminedisulfonate is basified to a pH of 10.0 or above. Preferably, the basic compound added to the aqueous medium is a basic hydroxide such as potassium hydroxide, sodium hydroxide, calcium hydroxide or magnesium hydroxide. The basification to a pH of 10.0 or above will convert the magnesium ions present in the aqueous medium to a magnesium hydroxide precipitate which is then separated so as to provide an aqueous medium containing dissolved sulfites and hydroxylaminedisulfonate.

After separation of the magnesiumhydroxide, an oxidizing agent is added to the aqueous medium in a stoichiometric ratio of between 1.1 to 1.2 on the basis of the existing sulfite concentration so that:

a) all of the sulfites will be oxidized:

$$SO_3^{-2} + H_2O_2 \rightarrow SO_4^{-2} + H_2O; \text{ and}$$

b) any remaining ferrous ions will be oxidized to the ferric state:

$$2\ Fe^{++} + H_2O_2 \rightarrow 2\ Fe^{+++} + 2OH^-.$$

The oxidizing agent converts the dissolved sulfites to sulfates which precipitate from the aqueous medium and are separated therefrom. The oxidizing agent should be one that is soluble in the aqueous medium and reacts with dissolved sulfites, a preferred oxidizing agent being hydrogen peroxide.

The aqueous medium, which has now had solid sulfites, dissolved sulfites and magnesium ions removed therefrom then has added thereto a sulfate salt, such as potassium sulfate, sodium sulfate or magnesium sulfate, in about a 1:1 stoichiometric ratio with the existent amine disulfonate moiety concentration with potassium sulfate being preferred. The sulfate salt reacts with hydroxylaminedisulfonate present in the aqueous medium to produce a solid amine disulfonate salt which precipitates from the aqueous medium as a pure product. When potassium sulfate is used, for example, the relatively insoluble potassium amine disulfonate salt is formed which precipitates from the aqueous medium:

$$[N(SO_3)_2]^{-2} + K_2SO_4 \rightarrow K_2NH(SO_3)_2 + SO_4^{-2}.$$

In the most preferred operation of the present invention, sodium hydroxide is used as the base in basifying the aqueous medium to a pH of about 10.5, hydrogen peroxide is used as the oxidizing agent, and potassium sulfate is used as the sulfate salt, with production of potassium amine disulfonate as a pure product.

Referring now to the drawing, where the present method is schematically illustrated, a wet scrubbing unit 1 is provided which has charged thereto an aqueous scrubbing medium for sulfur dioxide which contains magnesium ions and sulfite ions. The aqueous scrubbing medium is preferably an aqueous magnesium-enhanced lime slurry fed through line 3 to a hold or recycle tank 5, the sorbent recycled through line 7, pump 9, and line 11 to the wet scrubbing unit 1. In the wet scrubbing unit 1, the sorbent flows downwardly countercurrent to an upward flow of a sulfur dioxide and nitrogen oxide-containing gas stream that is fed to the wet scrubbing unit 1 through line 13 and cleaned gas discharged through line 15. A chelating agent, such as ferrous EDTA, is also charged to the wet scrubbing unit such as through line 17. In the wet scrubbing unit, the aqueous scrubbing medium reacts with the sulfur dioxide and the nitrogen oxides to form solid sulfites, dissolved sulfites and N—S compounds, such as HADS, which are passed to the recycle tank 5 through line 19. A portion of the aqueous medium containing magnesium ions, solid sulfites, dissolved sulfites and HADS is removed through line 21 and charged to the concentrator, such as a thickener 23.

In the thickener 23, the solid sulfites are settled and removed as a thickener underflow through line 25, while clarified aqueous liquor or thickener overflow is returned to the wet scrubbing unit, such as through line 27 to recycle line 11 for reuse. The thickener underflow is passed to a solids separator, such as a filter 29, and the solid sulfites present therein are removed and discharged through line 31. The aqueous medium, which now contains magnesium ions, dissolved sulfites and HADS is passed through line 33 to a collection tank 35. A portion of the thickener overflow from line 27 may also be charged to the collection tank 35 through line 37. If desired, a portion of the aqueous medium from collection tank 35 may be returned to the wet scrubbing unit 1 such as by being fed through line 39 to recycle tank 5.

Aqueous medium is fed from collection tank 35, through line 41, to a basifying reaction tank 43. In the basifying reaction tank 43, the aqueous medium is basified by the addition of a base, through line 45, to a pH of at least 10.0, which converts the magnesium ions present in the aqueous medium to magnesium hydroxide which precipitates from the aqueous medium. The resulting mixture is passed through line 47 to a separator 49 and the magnesium hydroxide precipitate is removed therefrom through line 51. The aqueous medium which now contains dissolved sulfites and HADS is passed through line 53 to an oxidizing tank 55 and an oxidizing agent, such as hydrogen peroxide, is added through line 57 to oxidize the dissolved sulfites to sulfates. The sulfates, so produced, will precipitate from the aqueous medium and the mixture is passed through line 59 to a solids separator 61. The solid sulfates are separated and removed through line 63, while the aqueous medium which now contains HADS is passed through line 65 to a reaction tank 67. To the aqueous medium in reaction tank 67 there is added a sulfate salt, such as potassium sulfate, through line 69 which reacts with the HADS to form a precipitate of an amine disulfonate salt. The resultant aqueous medium and precipitated amine disulfonate salt are passed through line 71 to a separator 73, with the amine disulfonate salt separated therein and discharged through line 75 to a product collection unit 77. The residual aqueous medium is removed from the separator 73 through line 79 for discharge or further recovery. For example, if desired, the aqueous medium, which may contain residual ferric-EDTA may be passed through line 81 and treated, such as in an electrochemical cell 83 to reduce the ferric-EDTA to ferrous-EDTA which ferrous-EDTA may be returned to the wet scrubbing unit, such as through line 85 to the recycle tank 5.

EXAMPLE I

As an example of the method of the present invention, a sulfur dioxide and nitrogen oxide removal process for a hot gaseous stream was carried out by contacting the gas stream in a wet scrubbing unit with an aqueous scrubbing medium containing 6000 ppm magnesium ions and 6000 ppm of sulfite ions at a pH of 6.5 in the presence of 20 mM of ferrous EDTA. A portion (bleed stream) of the reacted aqueous medium was removed from the scrubbing system and contained 5000 ppm magnesium ions, 10,000 ppm solid sulfites, 5000 ppm dissolved sulfites, and 100 mM HADS. The solid sulfites were removed in a solids separating device. After separation of the solid sulfites, the aqueous medium containing magnesium ions, dissolved sulfites and HADS at a pH of 6.0 was basified to a pH of 10.0 by addition thereto of about 10 percent by volume of 8N potassium hydroxide. A precipitate of magnesium hydroxide was formed which was separated from the aqueous medium. After separation of the magnesium hydroxide about 10 percent by volume of 30% hydrogen peroxide was added which oxidized the dissolved sulfite to sulfates, the sulfates precipitating and then separated from the aqueous medium. To the residual aqueous medium there was then added potassium sulfate at the rate of about 0.08 gram per milliliter of aqueous medium and a solid amine disulfonate salt, 2.7 grams, was formed (KADS) (0.008) gm/ml of initial aqueous medium, or 0.1 gm KADS per gm $K_2SO_4$ added) which precipitated from the aqueous medium and was recovered.

EXAMPLE II

A portion of a bleed stream from a $SO_2/NO_x$ scrubbing system containing the components of the portion described in Example I, after separation of solid sulfites therefrom by filtration had added thereto sodium hydroxide at a rate of 3% by weight to volume of aqueous medium (9 g NaOH pellets to 300 ml aqueous medium) in an amount to raise the pH of the portion ($F_o$) to 12.1 which was characterized by a white/ecru colored endpoint after which additional sodium hydroxide pellets failed to raise the pH. Filtration of this high pH suspension results in a filtrate of pH 12.3 which contains the bulk of the N—S compounds associated primarily with sodium and devoid of any appreciable interfering cations and anions.

This filtrate, labeled $F_1$, was subjected to treatment with three separate alkaline reagents (calcium hydroxide, magnesium hydroxide, and slurried Maysville lime of ~6% magnesium hydroxide content) in order to determine if precipitation of either calcium ADS or magnesium ADS would occur. Very little solids formation occurred, although subsequent laboratory analyses showed some precipitation of ADS to the solid phase using the slurried lime, less ADS precipitation with calcium hydroxide and very little ADS precipitation with magnesium hydroxide. This implies that magnesium ADS is more soluble than its calcium analog and that a potential Mg/Ca mixed ADS product is the least soluble potential product. Hence this filtrate, $F_1$, essentially contains the bulk of the ADS (and other N—S compounds, primarily sulfamic acid, SA) and it is from the liquid phase that ADS recovery must occur in this embodiment.

In order to determine the potential recovery of ADS from $F_1$, an aliquot was allowed to evaporate so that an ADS analysis could be performed on the resultant residue. The ADS was concentrated in this endeavor by a factor of over 40. Thus an evaporative technique can be successfully utilized to concentrate ADS from the liquor phase, with the liquor recycled back to the process loop.

In yet another embodiment of the process, $F_1$ was mixed with an equal volume of acetone in an effort to separate the ADS and sulfamic acid (SA) components, since the literature reports that SA is soluble in acetone and other organic solvents. The mixture was separated in a separatory funnel and the aqueous and acetone phases were each evaporated. The resultant residues were analyzed for N—S compounds with positive results. The aqueous phase residue showed a N—S distribution of 95.9% of the total ADS present whereas the acetone phase showed an N—S distribution of 83.6% of the SA present. Thus this technique allows concentration of the ADS in the aqueous phase and concentration of the SA in the solvent phase with recycling of the liquor and solvent back to the process loop.

What is claimed is:

1. A method for the removal of sulfur dioxide and nitrogen oxides from a gaseous stream said method comprising:

contacting said gaseous stream in a wet scrubbing unit with an aqueous scrubbing medium containing magnesium ions and sulfite ions at a pH of 5.5 to 7.0, in the presence of a metal chelating agent, whereby solid sulfites, dissolved sulfites and hydroxylaminedisulfonate are produced in said aqueous medium;

removing a portion of aqueous medium containing magnesium ions, solid sulfites, dissolved sulfites and hydroxylaminedisulfonate from said wet scrubbing unit;

separating said solid sulfites from said portion of aqueous medium;

basifying said portion of aqueous medium to a pH of 10.0 or above to convert said magnesium ions to a magnesium hydroxide precipitate;

separating said magnesium hydroxide precipitate, so formed, from said aqueous medium;

adding an oxidizing agent to said portion of aqueous medium to convert dissolved sulfites to sulfates which precipitate from said aqueous medium;

separating said sulfates, so formed, from said aqueous medium; and adding a sulfate salt to said portion of aqueous medium to produce an amine disulfonate salt which precipitates from said aqueous medium.

2. The method for the removal of sulfur dioxide and nitrogen oxides from a gaseous stream as defined in claim 1 wherein said sulfate salt is selected from the group consisting of potassium sulfate, sodium sulfate and magnesium sulfate.

3. The method for the removal of sulfur dioxide and nitrogen oxides from a gaseous stream as defined in claim 2 wherein said sulfate salt is potassium sulfate and said amine disulfonate salt is potassium amine disulfonate.

4. The method for the removal of sulfur dioxide and nitrogen oxides from a gaseous stream as defined in claim 1 wherein basifying of said aqueous medium is effected by the addition of a hydroxide from the group consisting of potassium hydroxide, sodium hydroxide, calcium hydroxide and magnesium hydroxide.

5. The method for the removal of sulfur dioxide and nitrogen oxides from a gaseous stream as defined in claim 1 wherein said oxidizing agent is hydrogen peroxide.

6. The method for the removal of sulfur dioxide and nitrogen oxides from a gaseous stream as defined in claim 1 wherein said aqueous scrubbing medium comprises an aqueous slurry of calcium hydroxide containing magnesium oxide or magnesium hydroxide in an amount to provide 2500 to 9000 parts per million of magnesium ions.

7. The method for the removal of sulfur dioxide and nitrogen oxides from a gaseous stream as defined in claim 1 wherein said metal chelating agent is ferrous ethylenediaminetetraacetic acid.

8. A method for the removal of sulfur dioxide and nitrogen oxides from a gaseous stream said method comprising:

contacting said gaseous stream in a wet scrubbing unit with an aqueous scrubbing medium containing magnesium ions and sulfite ions at a pH of 5.5 to 7.0, in the presence of ferrous ethylenediaminetetraacetic acid, whereby solid sulfites, dissolved sulfites and hydroxylaminedisulfonate are produced in said aqueous medium;

removing a portion of aqueous medium containing magnesium ions, solid calcium sulfites, dissolved sulfites and hydroxylaminedisulfonate from said wet scrubbing unit;

separating said solid calcium sulfites from said portion of aqueous medium;

basifying said portion of aqueous medium to a pH of 10.0 or above to convert said magnesium ions to a magnesium hydroxide precipitate;

separating said magnesium hydroxide precipitate, so formed, from said aqueous medium;

adding an oxidizing agent to said aqueous medium to convert dissolved sulfites to sulfates which precipitate from said aqueous medium;

separating said sulfates, so formed, from said aqueous medium; and adding a potassium sulfate to said aqueous medium to produce a potassium amine disulfonate salt which precipitates from said aqueous medium.

9. The method for the removal of sulfur dioxide and nitrogen oxides from a gaseous stream as defined in claim 8 wherein basifying of said aqueous medium is effected by the addition of a hydroxide from the group consisting of potassium hydroxide, sodium hydroxide, calcium hydroxide and magnesium hydroxide.

10. The method for the removal of sulfur dioxide and nitrogen oxides from a gaseous stream as defined in claim 8 wherein said oxidizing agent is hydrogen peroxide.

* * * * *